United States Patent [19]

Date

[11] Patent Number: 4,769,711
[45] Date of Patent: Sep. 6, 1988

[54] IMAGE PICKUP APPARATUS HAVING A SETTABLE LENS MOUNTING SURFACE

[75] Inventor: Nobuaki Date, Kanagawa, Japan

[73] Assignee: Canon Kabushiki Kaisha, Tokyo, Japan

[21] Appl. No.: 891,205

[22] Filed: Jul. 28, 1986

[30] Foreign Application Priority Data

Jul. 30, 1985 [JP] Japan ............................ 60-117288[U]
Jul. 30, 1985 [JP] Japan ............................ 60-117289[U]

[51] Int. Cl.$^4$ .......................................... H04N 5/225
[52] U.S. Cl. ..................................... 358/229; 358/225
[58] Field of Search ....................... 358/229, 225, 909; 354/286, 152, 189

[56] References Cited

U.S. PATENT DOCUMENTS 3,706,848 12/1972 Rovet ................................. 358/225

Primary Examiner—Jin F. Ng
Assistant Examiner—Stephen Brinich
Attorney, Agent, or Firm—Robin, Blecker & Daley

[57] ABSTRACT

Disclosed is a camera body provided with a mount member having a mount surface for mounting a lens, and holding means for holding the mount member so that the angle of orientation of the mount surface with respect to the camera body is adjustable from the outside of the camera body, thereby it being made possible to adjust the angle of orientation of the mount surface from the outside.

6 Claims, 2 Drawing Sheets

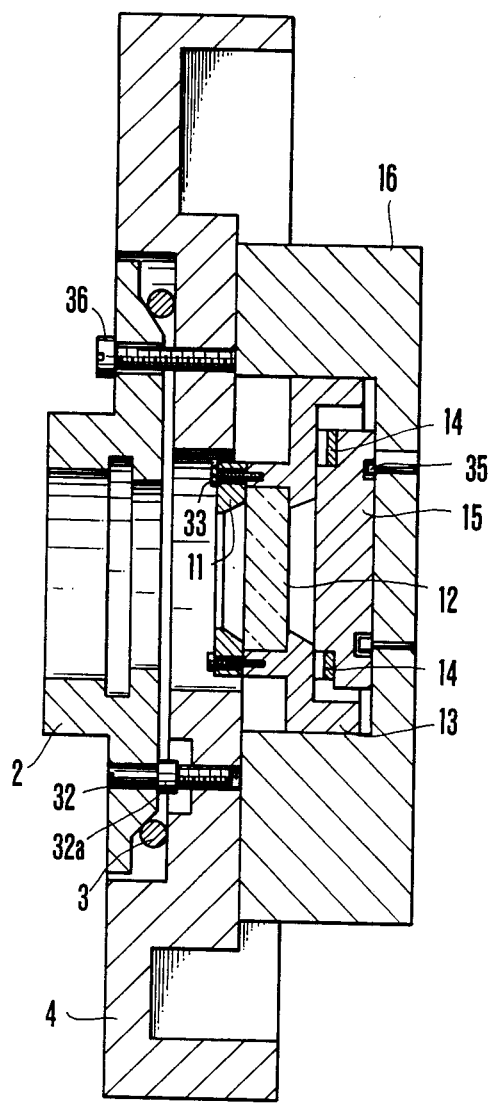

IMAGE PICKUP APPARATUS HAVING A SETTABLE LENS MOUNTING SURFACE

BACKGROUND OF THE INVENTION

1. Field of the Invention

This invention relates to image pickup apparatus, and more particularly to a body of image pickup apparatus having a mount surface for mounting a lens.

2. Description of the Related Art

To adjust the flange back of camera, or the distance from the reference surface (flange surface) at which the lens is attached to the body to the film plane, for the mount surface for attachment of the lens is fixed in position, the photographic lens may be provided with a relay lens as arranged to be axially movable. Such an adjusting method was ever used in the past.

However, because the use of this method led to the necessity of incorporating the movable relay lens into the photographic lens system, if any of the interchangeable lenses available in the market which had generally no movable relay lens was used, such flange back adjustment could not be carried out. In order to make such flange back adjustment possible even with the use of such commonly available interchangeable lens, the mount surface at which the interchangeable lens is attached to the camera body must be made axially movable.

According to the prior art, therefore, a plurality of washers of different thickness were prepared. And, the flange back adjustment was carried out by the method of trial and error. In more detail, one of such washers was selected to be inserted into between the mount surface-constituting member and the camera body. Then, this member was fastened to the camera body. If the video signals obtained from such camera were found by means of a monitor or the like to have a defect as attributed to the washer of inappropriate thickness, the member of the mount surface should be disassembled from the camera body, and, after the washer was exchanged by another one whose thickness was different from that of the former, reassembled thereto. Besides the flange back adjustment, the angle of orientation of the mount surface with respect to the camera body was made adjusted in a similar way.

The above-described method of exchanging the washers when applied to not only the adjustment of the axial position of the mount surface but also the adjustment of the angle of its orientation had problems that the disassembling followed by the reassembling of the mount member to the camera body had to be repeated usually a large number of times until a satisfactory result was attained, and that as the degree of tolerance on the angle of orientation of the mount surface increased, many kinds of washers were necessarily prepared.

SUMMARY OF THE INVENTION

A first object of the present invention is to eliminate the above-described problems of the prior art.

A second object under such a first object is to provide an image pickup apparatus which enables the set position of the mount surface to be adjusted very easily.

A third object is to provide an image pickup apparatus which enables the set position of the mount surface to be adjusted from the outside of the body.

To achieve such objects, according to a preferred embodiment of the invention, a camera body is disclosed, having a mount surface at which a lens is attached to the camera body and holding means making it possible that the set angle of orientation of the mount surface with respect to the camera body is adjusted from the outside of the camera body.

Another object of the invention as applied to the image pickup apparatus using an image pickup element is to provide a structure of holding the image pickup element while radiating head with good efficiency.

To achieve such an object, according to a preferred embodiment of the invention, an image pickup element structure is disclosed, having a radiator member for liberating the heat generated in the image pickup element, an optical member of the transparent type for protecting the image receiving surface of the image pickup element, and a member holding the optical member and combined with the radiator member so as to air-tightly seal the image receiving surface.

Other objects of the invention will become apparent from the following description of embodiments thereof.

BRIEF DESCRIPTION OF THE DRAWINGS

FIG. 2 is a sectional view taken along line A-A' of FIG. 1.

DETAILED DESCRIPTION OF THE PREFERRED EMBODIMENT

Figure 1:
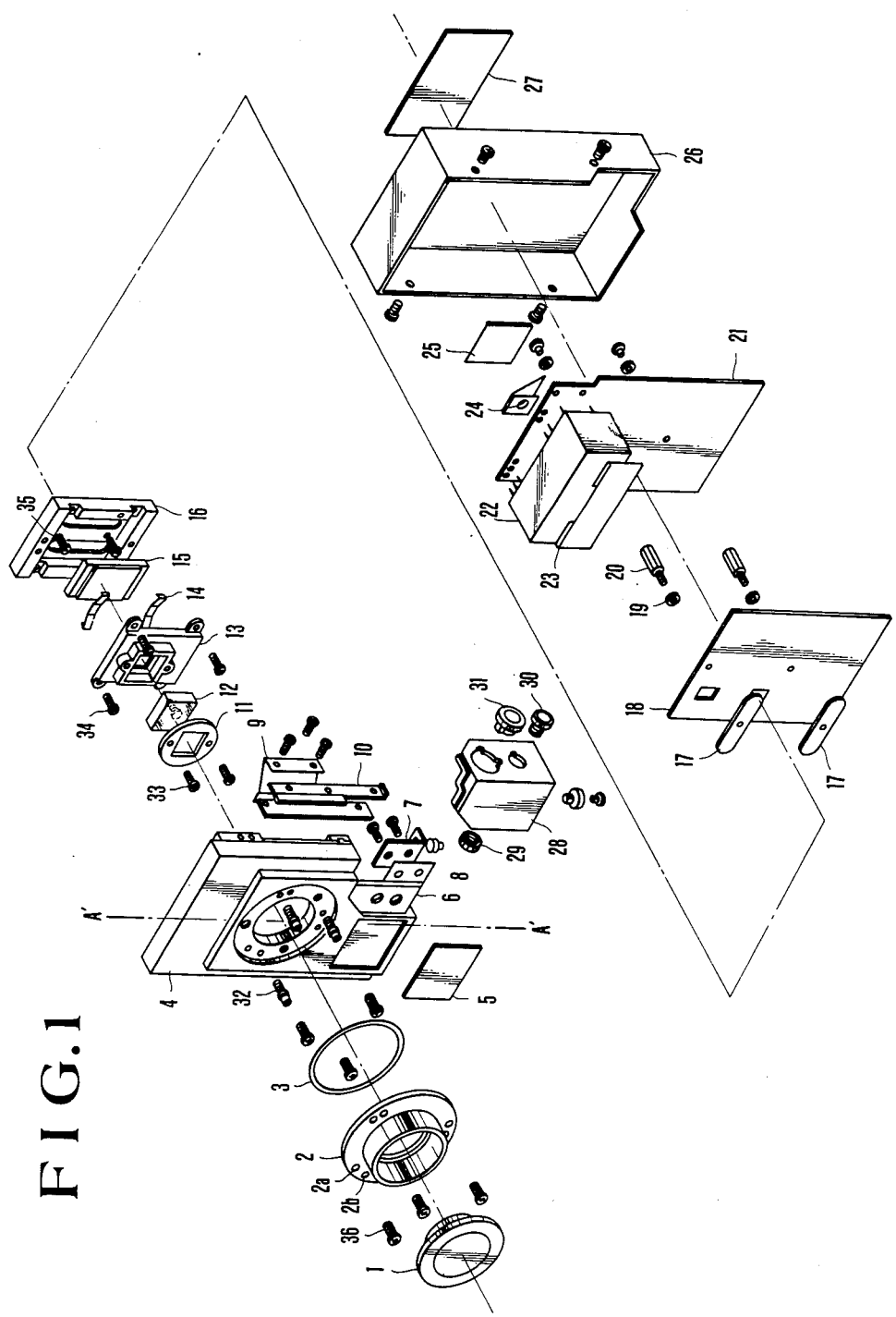
FIG. 1 is an exploded perspective view of an embodiment of the video camera according to the present invention.

The present invention will next be described in detail by reference to the drawings. Though the embodiment to be described below is connected to a solid state image pickup element that converts an optical image of an object being photographed to electrical signals, or the so-called video camera, it is, needless to say, understood that the present invention is applicable to other types of image pickup apparatus.

In FIG. 1 there is shown an embodiment of the invention applied to the video camera whose main parts in assembly are shown in FIG. 2. A dust-proof cap 1 is attachable to a lens mount member 2 when no interchangeable lens is in use. An O-ring 3 lies between the mount member 3 and a framework 4 of the camera body to prevent dust from entering the interior of the body. A name plate 5 is pasted on the front panel of the body 4. A white-balance adjusting variable resistor 8 is borne on a metallic carrier 7 fixedly mounted to the framework 4 through an electrical insulator plate 6. A heat-radiation leaf spring 9 is fixedly mounted to a heat-radiation plate 10 by which the heat of circuit elements on a substrate 18 is liberated. A mask disc 11 for cutting off stray light from entering a CCD 15 also serves as a retainer for fixedly securing a quartz plate 12 to a protection frame 13 by screw fasteners 33. The quartz plate 12 passes light from a lens therethrough and functions as an optical low pass filter. The protection frame 13 co-operates with the quartz plate 12 and the mask disc 11 to cover the image pickup element or CCD 15. A pair of leaf springs 14 press the CCD 15 against a heat radiator 16 through which the heat the CCD 15 generates is dispersed to the framework 4 so that the CCD 15 is prevented from being over-heated. The heat radiator 16 is so formed as to enclose all the sides of the CCD 15, and co-operates with the quartz plate 12 and the protection frame 13 to air-tightly seal the image pickup surface of the CCD 15. Fixedly mounted through spacers 17 on the back of the heat radiator 16 is the aforesaid substrate 18 having a part of a signal processor fabricated thereon, the other part of which is fabricated on another substrate 21 fixedly mounted on the back of the first substrate 18 through a pair of screw-headed spacers 20 with washers 19. A DC-DC converter 22 receptive of a voltage from a connector 30 produces an output voltage which is applied to drive the CCD 15 and also to the signal processor on the substrates 18 and 21. A heat radiation resilient plate 23 is provided on the DC/DC converter 22. The heat of the circuit elements on the substrate 21 is liberated by a leaf spring 24. A heat radiation sheet 25 electrically insulates the heat radiation leaf spring 24 from a rear cover 26 and transfers the heat from the substrate 21 to the rear cover 26. The rear cover 26 is fixedly mounted to the framework 4 by screw fasteners, and has another name plate 27 on the back thereof. A connector mount 28 fixedly carries a connector 31 through which a diaphragm control signal is transmitted to the lens, and the connector 30 through which electrical power from a battery adapter (not shown) is supplied to the circuit in the camera. A plug (not shown) inserted in the connector 30 is stopped by a nut 29. In order to adjust the height of the mount member 2 constituting the mount surface, three screws 32 each having a flange 32a are positioned in equally spaced relation as shown in FIG. 1. The screws 33 fasten the mask disc 11, the quartz plate 12 and the protection frame 13 in unison. This unit is fixedly mounted to the heat radiation plate 16 by screw fasteners 34 with location pins 35. The mount member 2 is fixedly secured to the body 4 by screw fasteners 36.

The features of the thus-constructed camera which are considered to be characteristic of the invention are explained below.

As is obvious from FIGS. 1 and 2, the mask 11, quartz 12, protector 13, CCD 15 and radiator 16 are assembled in a common package. That is, one of the features is that the mask 11, quartz 12 and protector 13 are fixedly secured by the screw fasteners 33 to a unit. Another feature is that the protector 13 and the radiator 16 are fixedly secured by the screw fasteners 34 to a unit. Further, the position of the CCD 15 on the optical axis of the photographic lens is defined when it is pressed against the radiator 16 by the retainer spring 14, and the angular position of the CCD 15 about the optical axis is also defined when the location pins 35 extending forwardly of a cross-wall of the radiator 16 snugly seat in respective holes provided in the opposite or back surface of the casing for the CCD 15 to the image receiving surface thereof. These constitute still another feature of the invention. An advantage of the invention is, therefore, that, due to the complete enclosure of the image receiving surface of the CCD 15 by the radiator 16 and the quartz 12 in the frame 13, that surface is maintained clear of dust which would otherwise be deposited thereon with the result of superimposition of noise on the video signals. Another advantage is that, due to the use of the radiator 16 as the carrier for the frame 13, there is no need to make use of an additional member solely as the carrier. Another feature of the invention is that instead of constructing the frame 13 and the radiator 16 in such form that the former encompasses the latter, the size of the radiator 16 is made so large that the frame 13 can be mounted on it by using screw fasteners 34, and that all four sides of the CCD 15 are integrally enclosed. This produces an advantage that the heat is liberated from the CCD 15 with an improved efficiency. Further, as shown in FIG. 2, the radiator 16 is put in intimate contact with the framework 4 of the camera body so that the heat given off from the radiator 16 is not stored in the camera body but freed to the air through the framework 4. Therefore, the heat radiation characteristic of the camera is excellent.

Another feature is that the lens mount member 2 is made adjustable in the distance from its mount surface to the CCD 15 by means of the flanged screws 32. Still another feature is that these adjusting screws 32 are accessible from the outside of the camera body by a screw driver inserting into each penetration hole 2b provided through the wall of a flanged portion of the mount member 2. A furthermore feature is that such adjusting screws 32 are, as has been mentioned above, three in number and have their positions at equal distances to each other in the mount surface so that the set angle of the mount surface to the body can be adjusted by turning the adjusting screws 32 individually.

In the illustrated embodiment, the means for holding the mount member 2 on the camera body in such a way that the set angle of the mount surface to the camera body is adjustable from the outside of the camera body is constructed from the fastener screws 36 by which the mount member 2 is fixedly secured to the camera body 4 and the screws 32 threaded into the camera body 4 and having the flanges 32a on which the mount member 2 abuts. This holding means may be modified by omitting the adjusting screws 32 and substituting a resilient gasket (like the O-ring which in the illustrated embodiment has the only purpose of sealing up the camera body) arranged between the mount member 2 and the camera body framework 4 to urge the mount member 2 away from the camera body framework 4 to abut on the shoulders of the retainer screws 36.

Though the embodiment of the invention has been described by taking an example of the video camera, it is to be understood that, as has been stated before, the present invention is applicable to cameras using silver halide film.

In the illustrated embodiment, the means for liberating the heat generated in the image pickup element is constructed in the form of the radiator 16, and the optical member of the transparent type for protecting the image receiving surface of the image pickup element is made of quartz 12. In latter connection, it should be noted that another material such as glass or transparent plastic may be used. Also, the means for fixedly securing the frame 13 holding the optical member to the radiator 16 has the form of the fastener screws 34. Instead of the screws 34, it is, of course, possible to use another method of adhesive agent or the like.

. As has been described above, according to the embodiment of the invention, the image pickup element is provided with a heat radiating member of such form as to contact with the four sides and back surface of the element, an optical member of the transparent type for protecting the image receiving surface of the image pickup element, a member for holding the optical member and, in connection with the radiator member, air tightly sealing the image receiving furface, whereby without using any wasteful members, the image receiving surface of the image pickup element can be sealed, and the heat generated in the image pickup element can be liberated.

As has been described above, according to the invention, it is made possible to adjust the set angle of the mount surface for mounting a lens on the body with respect to the camera body from the outside of the camera. So, the necessity of preparing many kinds of washers and disassembling the mount from the camera body each time the washer is interchanged by a more appropriate one when the flange back adjustment is performed as in the prior art can be obviated. Therefore, an advantage is produced that the set angle of the mount surface can be adjusted simply and with an improved accuracy.

What is claimed is:

1. An image pickup apparatus for use with a lens which is interchangeable, comprising:
    (a) a mount member having a mount surface for mounting said lens;
    (b) holding means for forming a basic surface for holding said mount member;
    (c) an image pickup element mounted to said holding means for converting focussed radiation to electrical signals; and
    (d) means accessible from externally of said apparatus for adjustably holding said mount member to said basic surface so as to be able to adjust the set angle of said mount surface.

2. An image pickup apparatus for use with a lens which is interchangeable, comprising:
    (a) a mount member having a mount surface for mounting said lens;
    (b) a body framework;
    (c) and means accessible from externally of said apparatus for adjustably holding said mount member to said body framework so as to be able to adjust the set angle of said mount surface, said holding means including:
        fastening means for setting up said mount member on said body framework, and adjusting means making it possible to adjust the fixed position of said fastening means at at least three points of said fastening means.

3. An image pickup apparatus according to claim 2, wherein said fastening means comprises screws for fixedly securing said mount member to said body.

4. An image pickup apparatus according to claim 2, wherein said adjusting means includes:
    an elastic member provided between said mount member and said body framework; and adjusting members for determining the fixed position of said fastening means against the elastic force of said elastic member.

5. An image pickup apparatus according to claim 4, wherein said adjusting members are screws.

6. An image pickup apparatus according to claim 4, wherein said elastic member is an O-ring.

* * * * *